US009221160B2

(12) United States Patent
Ableitner et al.

(10) Patent No.: US 9,221,160 B2
(45) Date of Patent: Dec. 29, 2015

(54) MOTOR MOUNT (71) Applicant: Honeywell International Inc., Morristown, NJ (US)

(72) Inventors: Jason Ableitner, Edina, MN (US); Nathan Carlson, Maple Grove, MN (US); Tom Bakken, Apple Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 13/784,501

(22) Filed: Mar. 4, 2013

(65) Prior Publication Data
US 2014/0245590 A1 Sep. 4, 2014

(51) Int. Cl.
*B23P 19/10* (2006.01)
*B25B 27/14* (2006.01)
*B25B 27/00* (2006.01)
*H02K 5/00* (2006.01)
*H02K 7/116* (2006.01)
*H02K 15/16* (2006.01)

(52) U.S. Cl.
CPC ............. *B25B 27/14* (2013.01); *B25B 27/00* (2013.01); *H02K 5/00* (2013.01); *H02K 7/116* (2013.01); *H02K 15/16* (2013.01); *Y10T 29/49826* (2015.01); *Y10T 29/49895* (2015.01); *Y10T 29/49899* (2015.01); *Y10T 29/49902* (2015.01); *Y10T 29/53913* (2015.01)

(58) Field of Classification Search
CPC ........ B25B 27/14; B25B 27/00; H02K 7/116; H02K 15/16; H02K 5/00; Y10T 29/49895; Y10T 29/53913; Y10T 29/49899; Y10T 29/49902; Y10T 29/49826
See application file for complete search history.

(56) References Cited

U.S. PATENT DOCUMENTS

| 5,045,034 | A | 9/1991 | Almeda |
| 5,133,617 | A | 7/1992 | Sokn |
| 5,533,704 | A | 7/1996 | Fischinger et al. |
| 5,714,815 | A | 2/1998 | Fritzinger et al. |
| 6,262,504 | B1 | 7/2001 | Bartlett |
| 6,773,001 | B2 | 8/2004 | Saiki et al. |
| 7,078,835 | B2 | 7/2006 | Gross et al. |
| 7,318,394 | B2 | 1/2008 | Stevens et al. |
| 7,385,326 | B2 | 6/2008 | Sims, Jr. et al. |
| 7,834,499 | B2 | 11/2010 | Acosta et al. |
| 7,876,009 | B2 | 1/2011 | Baranowski et al. |
| 7,893,572 | B2 | 2/2011 | Pettitt et al. |
| 2006/0034707 | A1 | 2/2006 | Thomas et al. |
| 2009/0121568 | A1 | 5/2009 | Acosta et al. |
| 2011/0000329 | A1 | 1/2011 | Mangelsen et al. |
| 2011/0267231 | A1 | 11/2011 | Le et al. |

FOREIGN PATENT DOCUMENTS

JP 2247879 A 10/1990

*Primary Examiner* — John C Hong
(74) *Attorney, Agent, or Firm* — Seager, Tufte & Wickhem LLP (57) ABSTRACT

A system and method for guiding a motor into alignment with a transmission during assembly. The system may allow the motor to be placed into engagement with a motor mount in a first position, wherein in the first position, the position of the motor is constrained by guide structures such that the gear teeth of the drive gear and the gear teeth of a driven gear are not fully intermeshed, and a rotation axis of the drive gear is not parallel to a rotation axis of the driven gear. The motor may then be manipulated in the motor mount while constrained by the guide structures along a motion path until the gear teeth of the drive gear and the gear teeth of the driven gear are more fully intermeshed, and the rotation axis of the drive gear is substantially parallel to the rotation axis of the driven gear.

16 Claims, 12 Drawing Sheets

MOTOR MOUNT

TECHNICAL FIELD

The disclosure relates generally to motor mounts, and more particularly, to systems and methods for mounting a motor to a device such as an HVAC device.

BACKGROUND

HVAC systems often include mechanical actuators and the like to perform functions such as adjusting dampers and opening and closing valves. Some actuators include a motor coupled to a geared transmission. Spur gears are often used in the transmission assembly. During assembly, gear teeth of a gear connected to and driven by the motor may need to slide past and intermesh with gear teeth of the geared transmission. If the teeth are not properly aligned during this assembly process, sufficient forces may be exerted on the gear teeth to damage one or both gears and/or other components. Requiring the assembler to exercise sufficient care to avoid such gear damage may be difficult and burdensome, slow the assembly process and may reduce production yields and/or product reliability. What would be desirable is a motor mount that helps reduce such assembly concerns while allowing quick assembly with little or no finesse.

SUMMARY

The disclosure relates generally to motor mounts, and more particularly, to systems and methods for mounting a motor to a device such as an HVAC device. In one example, a system for guiding a motor into alignment with a transmission during assembly of the motor with the transmission may include a flange configured to be attached to a motor, and a transmission having a motor mount. In some cases, the flange may be configured to be attached to the motor proximal a pinion of the motor, and the flange may have a first wing and a second wing opposite the first wing, with the first wing and the second wing flanking the pinion. In some instances, the motor mount may include a bore structured to accommodate the pinion of the motor and one or more guide structures adjacent the bore. The one or more guide structures may include a first guide for guiding the first wing of the flange, and a second guide for guiding the second wing of the flange. The first guide and the second guide may be separate guide structures, or may be different parts of a common guide structure. The first guide and the second guide may be configured to mechanically guide the first wing and the second wing, respectively, such that the motor moves in a motion along a path. In a first position along the path, a rotation axis of the pinion may not be parallel with a rotation axis of a driven gear of the transmission, and as the motor is guided further along the path by the first guide and the second guide, the rotation axis of the pinion may be brought substantially parallel to the rotation axis of the driven gear of the transmission. In some instances, as the motor is guided along the path, one or more gear teeth of the driven gear of the transmission may be brought to intermesh with one or more gear teeth of the pinion gear.

In some instances, and in the first position, the first wing may be disposed in the first guide, and the second wing may bear against a top surface of the second guide. From the first position, rotating the motor relative to the motor mount of the transmission may move the motor to a second position along the path. In the second position, the rotation axis of the pinion may be substantially parallel with the rotation axis of the driven gear of the transmission, and at least one of the gear teeth of the driven gear may intermesh with at least one of the gear teeth of the pinion. The path may include an intermediate position between the first position and the second position. In the intermediate position, the second wing may not bear against a top surface of the second guide, and the second wing may be proximal to but not captured by a latch.

In some instances, a guide system for guiding motion of a motor to bring a drive gear of the motor into engagement with a driven gear of an HVAC device may include a guide for mechanically guiding the motor in a motion along a defined path. The drive gear and the driven gear may each have gear teeth, with the drive gear driven by the motor about a first rotation axis and the driven gear mounted to be rotatable about a second rotation axis. In a first position along the path, the first rotation axis of the drive gear may not be parallel with the second rotation axis of the driven gear, and the gear teeth of the drive gear may not be intermeshed with the gear teeth of the driven gear. As the motor progresses to a second position along the path, the first rotation axis of the drive gear may be brought substantially parallel with the second rotation axis of the driven gear, and the gear teeth of the drive gear may become intermeshed with the gear teeth of the driven gear. The guide may include one or more guide structures that may cooperate with a housing of the motor to mechanically guide the motion of the motor along the path.

In some cases, a method for engaging a drive gear of a motor with a driven gear of an HVAC device is provided. The motor and/or the HVAC device may have guide structures that guide the motor relative to the HVAC device as the motor is manipulated along a motion path during an assembly process of the HVAC device. The method may include the steps of manually placing the motor into engagement with a motor mount of the HVAC device in a first position, and manually manipulating the motor in the motor mount of the HVAC device. When in the first position, the position of the motor may be constrained by the guide structures such that the gear teeth of the drive gear and the gear teeth of the driven gear are not intermeshed, and a rotation axis of the drive gear is not parallel to a rotation axis of the driven gear. Manually manipulating the motor in the motor mount of the HVAC device may be constrained by the guide structures along the motion path until the gear teeth of the drive gear and the gear teeth of the driven gear are intermeshed, and the rotation axis of the drive gear is substantially parallel to the rotation axis of the driven gear. The step of manually manipulating the motor in the motor mount of the HVAC device may include simultaneously rotating the motor about the rotation axis of the drive gear and moving the motor such that the rotation axis of the drive gear moves more parallel to the rotation axis of the drive gear. In some cases, the step of manually manipulating the motor in the motor mount of the HVAC device may subsequently include moving the motor such that the rotation axis of the drive gear moves more parallel to the rotation axis of the drive gear without simultaneously rotating the motor about the rotation axis of the drive gear. The method may further include the step of securing the motor relative to the transmission once the gear teeth of the drive gear and the gear teeth of the driven gear are intermeshed, and the rotation axis of the drive gear is substantially parallel to the rotation axis of the driven gear. In some cases, securing the motor relative to the transmission may be accomplished with a latch that is part of the motor mount.

The above summary is not intended to describe each and every example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict several examples and are not intended to limit the scope of the disclosure. The disclosure may be more completely understood in consideration of the following description with respect to various examples in connection with the accompanying drawings, in which.

DESCRIPTION

The following description should be read with reference to the drawings, in which like elements in different drawings are numbered in like fashion. The drawings, which are not necessarily to scale, depict selected examples and are not intended to limit the scope of the disclosure. Although examples of construction, dimensions, and materials are illustrated for the various elements, those skilled in the art will recognize that many of the examples provided have suitable alternatives that may be utilized.

Figure 1:
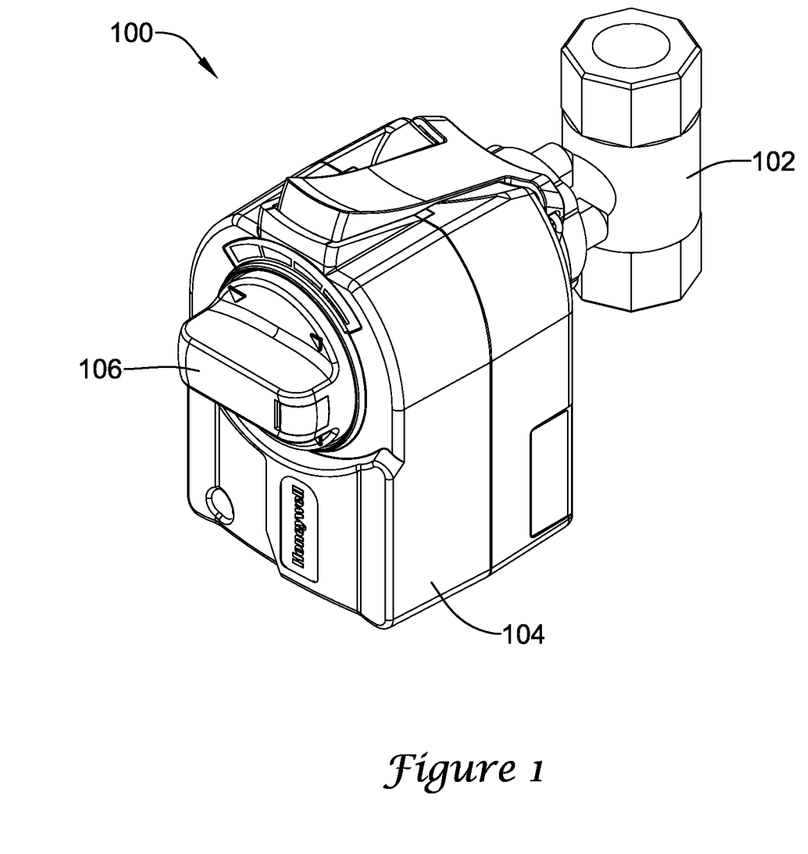
FIG. 1 is a schematic perspective view of an illustrative HVAC actuator coupled to a valve that is controllable by the actuator.

FIG. 1 is a schematic perspective view of an illustrative but non-limiting HVAC actuator 100 coupled to a valve 102 controllable by the actuator. While an HVAC actuator 100 is used here as an example, it is contemplated that the motor mount of the present disclosure may be used in any suitable device. Moreover, valve 102 of FIG. 1 is merely provided as an example of a component that actuator 100 may be employed to actuate. Actuator may be coupled to any suitable device amenable to actuation by the actuator, such as a damper, vane, etc. As shown in FIG. 1, HVAC actuator 100 may include a housing 104 that encloses a motor and a geared transmission, which are not visible in this view. The actuator 100, as illustrated in FIG. 1, may include a manually actuatable knob 106, but this is not required. The knob 106 may allow manual actuation of the component (such as valve 102) to which actuator 100 is coupled, as a supplement and/or backup to motorized actuation. The knob 106 may also provide a visual indication of the status/position of the actuator 100 and/or valve 102 (or other component). In some examples, only a visual indicator may be provided, without a manually-actuatable knob. In other examples, neither a knob nor a visual indicator is provided. Actuators of the present disclosure may provide any suitable mechanical actuation output, such as a rotary (as in the case of exemplary actuator 100) or linear output.

Figure 2:
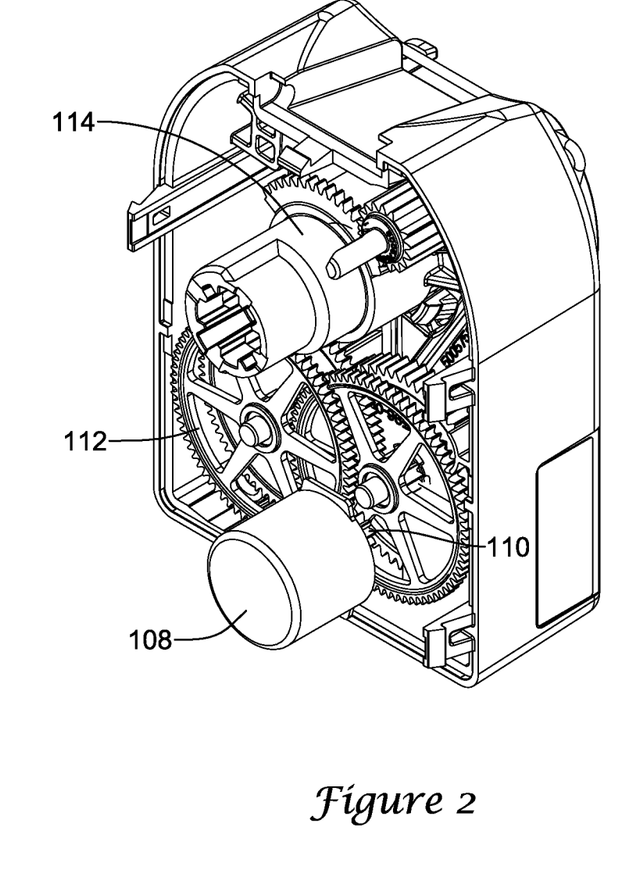
FIG. 2 is a schematic perspective view of some internal components of the illustrative actuator of FIG. 1, with some parts omitted to make the motor and some gears of the transmission visible.

FIG. 2 is a schematic perspective view of some internal components of the illustrative actuator 100 of FIG. 1, with parts of the housing 104 and additional internal parts omitted to make the motor 108 with a pinion 110 visible, along with some gears of the transmission, including first driven gear 112. In the example shown, the gears of the transmission may reduce the motion provided by the motor 108 to a final motion of the output shaft 114. As illustrated, the near end of output shaft 114 may be attached to knob 106 (see FIG. 1), and the far end (not visible in this view) may provide the actual output motion of the actuator to the valve 102.

Figure 3:
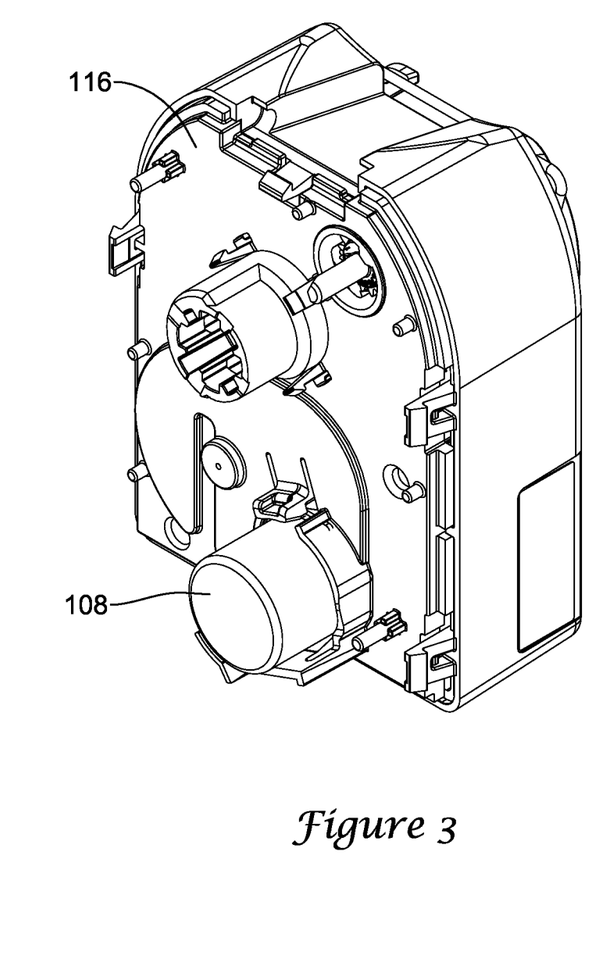
FIG. 3 is a schematic perspective view of some components of the illustrative actuator of FIG. 1, showing the relationship of the motor to a motor plate.

FIG. 3 is a schematic perspective view of some components of the actuator 100 of FIGS. 1 and 2 including a motor 108 and a motor plate 116. Motor 108 may be mountable on a top side (so named arbitrarily; the side visible in FIG. 3) of the motor plate 116 via a motor mount, which may include multiple parts that are discussed in further detail elsewhere in the present disclosure. The motor mount and the motor plate 116 may be considered to be components of the transmission. First driven gear 112 of the transmission may be affixed adjacent a bottom side of the motor plate 116 (behind the motor plate 116 in FIG. 3). Neither the bottom side of the motor plate 116 nor the first driven gear are visible in FIG. 3.

Figure 4:
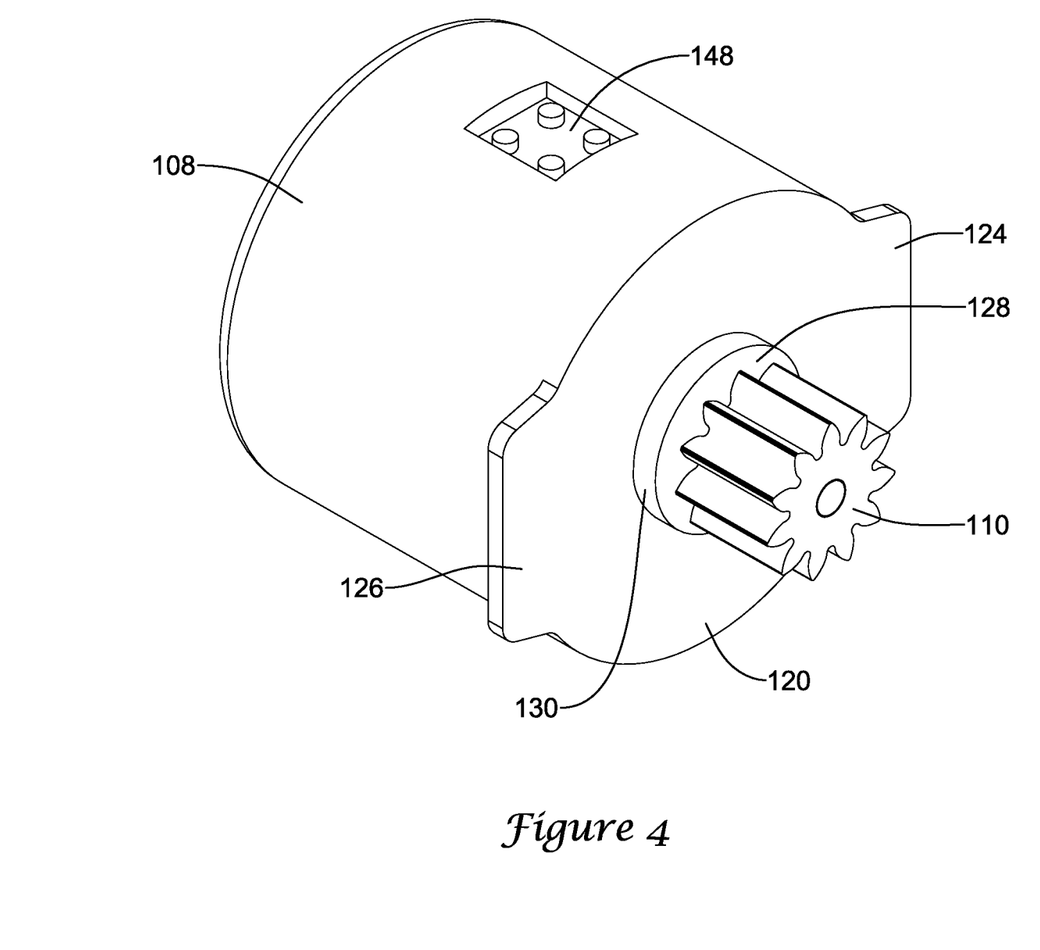
FIG. 4 is a schematic perspective view of an illustrative motor of the illustrative actuator of FIG. 1.
Figure 5:
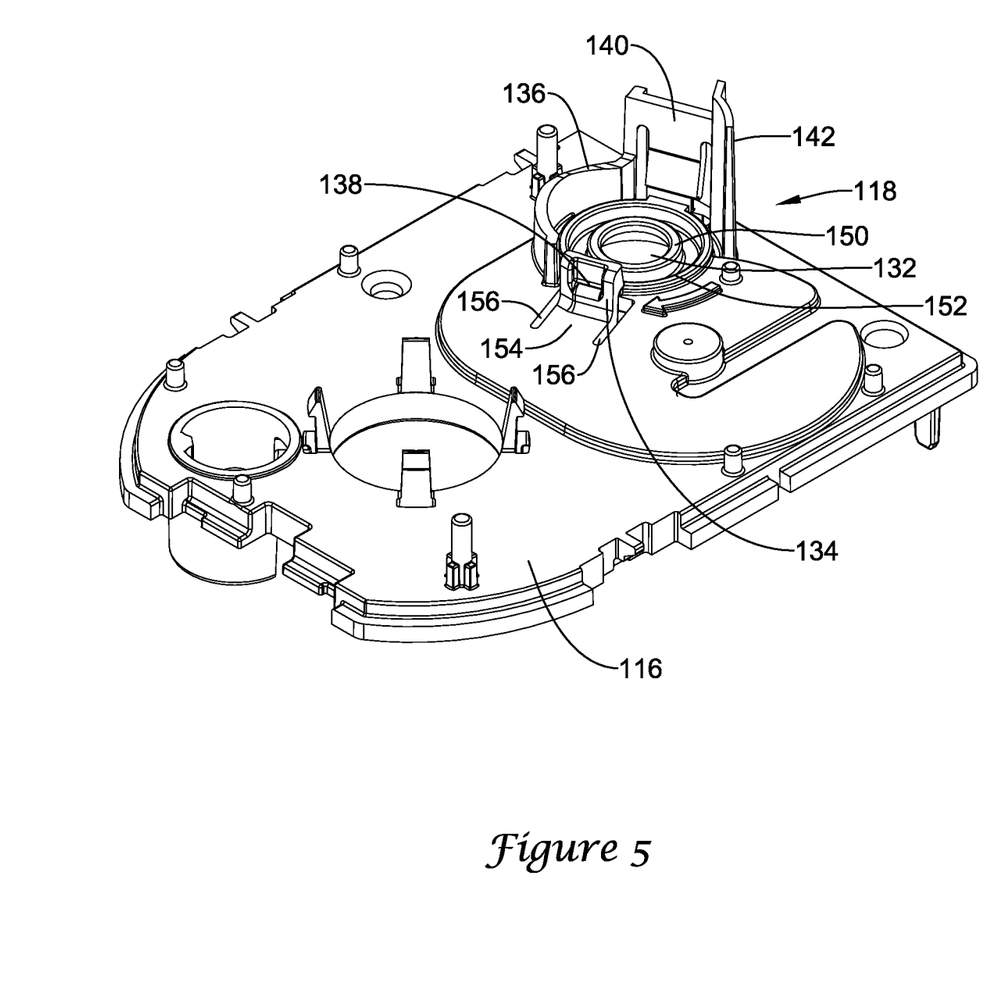
FIG. 5 is a schematic perspective view of an illustrative motor plate of the actuator of FIG. 1, including a motor mount.

FIG. 4 is a schematic perspective view of an illustrative motor 108, and FIG. 5 is a schematic perspective view of motor plate 116 having a motor mount 118. In FIG. 4, the illustrative motor 108 includes a flange 120 attached to the motor proximal pinion 110 of the motor. Flange 120 may be part of a housing of the motor 108, or in some cases, it may be attached to the motor external to a motor housing. In the example shown in FIG. 4, flange 120 may include a first wing 124 and a second wing 126 that flank pinion 110. Wings 124, 126 may cooperate with structures of motor mount 118 in one or more ways as described further herein. Such cooperation may be for guiding the motor 108 into alignment with the transmission during assembly of the motor 108 with the transmission, and/or for securing or otherwise attaching the motor 108 to the motor plate 116, and by extension, to the transmission. In some cases, flange 120 may include a pedestal 128 having a side wall 130 for spacing the pinion 110 away from the flange. As described further herein, the pedestal 128 may also cooperate with structures of the motor mount 118, but this is not required. In some examples, there may be no pedestal 128.

Turning to FIG. 5, the illustrative motor plate 116 may include a one or more features that provide a motor mount 118. The motor mount 118 may include a bore 132 dimensioned and structured to accommodate the pinion 110 of the motor 108. If the flange 120 includes pedestal 128, bore 132 may also be structured to accommodate the pedestal 128. Side wall 130 of pedestal 128 may bear against a side of the bore 132 in some configurations. In some examples, the pedestal 128 with side wall 130 and bore 132 are sized and toleranced to establish a consistent spatial relationship between pinion 110 and first driven gear 112 suitable for the desired application.

Motor mount 118 may include one or more guide structures adjacent the bore 132. Multiple guide structures may be referred to collectively as "a guide". The manner in which the guide structures may guide the motor 108 during assembly of the motor 108 with the transmission may be appreciated most fully after reading both the physical description of the motor mount 118, including guide structures, and the description of the assembly process.

In the example shown, motor mount 118 may include a first guide 134 for guiding the first wing 124 and a second guide 136 for guiding the second wing 126. The first guide 134 and the second guide 136 may be separate guide elements, or may be part of a common guide structure, as desired. Given that first driven gear 112 of the transmission may be affixed relative to the motor plate 116, guides 134, 136 may be considered to be fixed relative to the first driven gear and the transmission. The first guide 134 may be generally adjacent and concentric with respect to the bore 132 and may include a slot 138 into which first wing 124 may be guided progressively during mounting of the motor 108 to the motor mount 118, as discussed further herein in the description of the assembly process. The slot 138 may have at least one surface (e.g., top or bottom) against which the first wing may bear, with the surface extending a substantially constant distance above the top side of the motor plate along at least part of its length. Either or both of the top and bottom surfaces of the slot 138 may be chamfered to help guide first wing 124 into the slot (on the right wide of first guide 134 as illustrated in FIG. 5). The second guide 136 may also be generally concentric with respect to the bore 132 and be spaced above the top side of the motor plate 116. In the example shown, the second guide 136 may include a top surface against which the second wing 126 may bear, with the second guide configured to guide the second wing to a latch 140 which may be configured to capture the second wing. The top surface of the second guide 136 may slope down toward the top side of the motor plate 116 along at least part of its length, as in the example illustrated in FIGS. 5 and 7-10. However, this is not necessary in all configurations, and the top surface may maintain an essentially constant height above top surface of the motor plate in some cases. When so provided, the latch 140 may be structured to form an interference fit with the second wing 126 when the second wing is captured by the latch, thereby enabling the latch to secure the motor 108 relative to the motor plate 116. The motor mount 118 also may include a wall 142, whose function(s) are described elsewhere herein.

Figure 6:
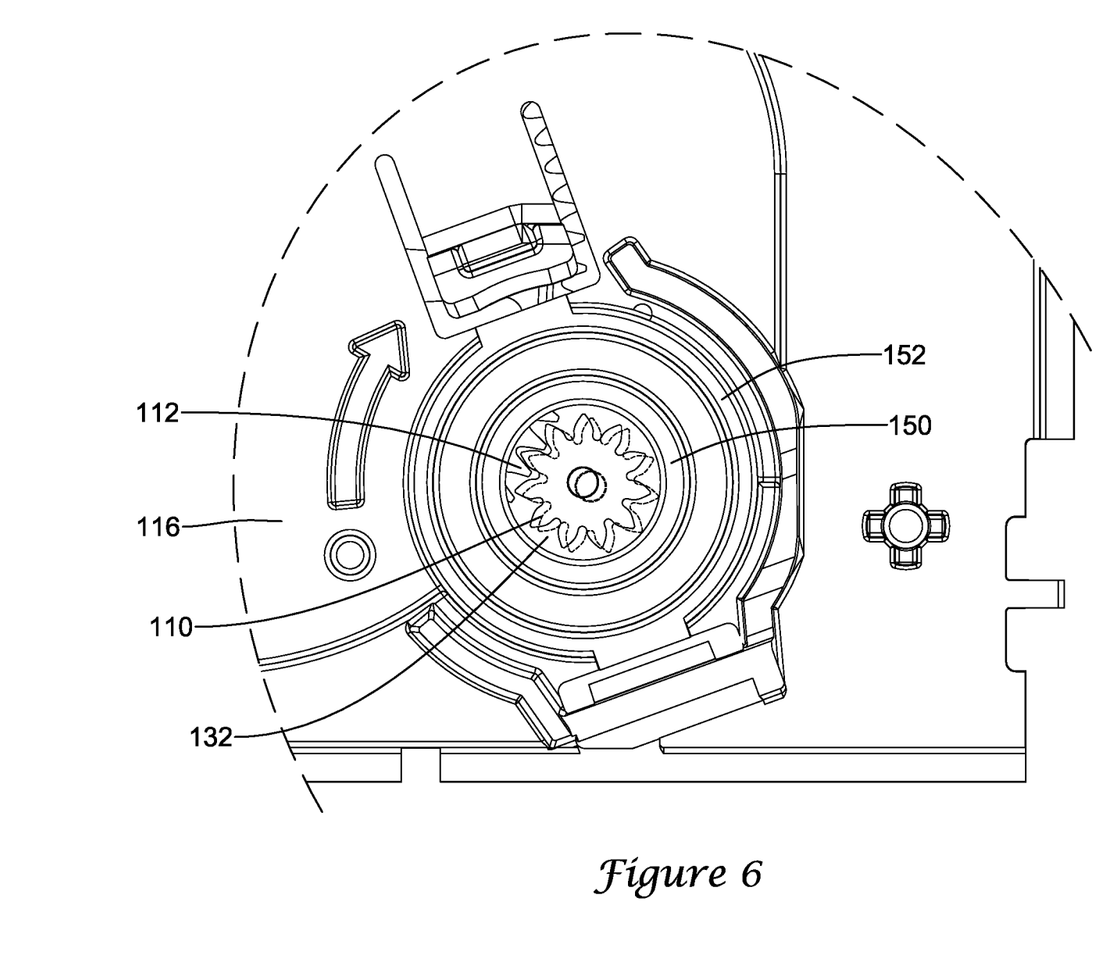
FIG. 6 is a schematic top view of the motor mount of FIG. 5.

The guide structures of the motor mount 118, such as first guide 134 and second guide 136, may be configured to cooperate with features of the motor 108, such as the wings 124, 126 of flange 120, to mechanically guide the motor 108 in a motion along a motion path into alignment with a transmission during assembly of the motor with the transmission. Such an arrangement may be provided and employed with one of the goals to reduce or eliminate the occurrence of damage to the gears such as the pinion gear 110 and first driven gear 112 during assembly. Rather than bringing the gears 110, 112 together axially, which in some cases can result in damage to gear teeth if the teeth are misaligned, the guide structures, in cooperating with motor features, can help bring the gears together at least partially laterally, potentially giving the gears an opportunity to rotate into alignment as they are brought together. This is illustrated conceptually in FIG. 6, which schematically illustrates details of the engagement of pinion 110 with first driven gear 112 relative to the motor mount 118 of motor plate 116. Pinion 110 is shown in phantom before engagement with first driven gear 112, and with solid lines after the gears are brought into engagement. As can be seen, pinion 110 may move at least partially laterally relative to first driven gear 112 and motor plate 116 within bore 132 during the assembly process.

Figure 7:
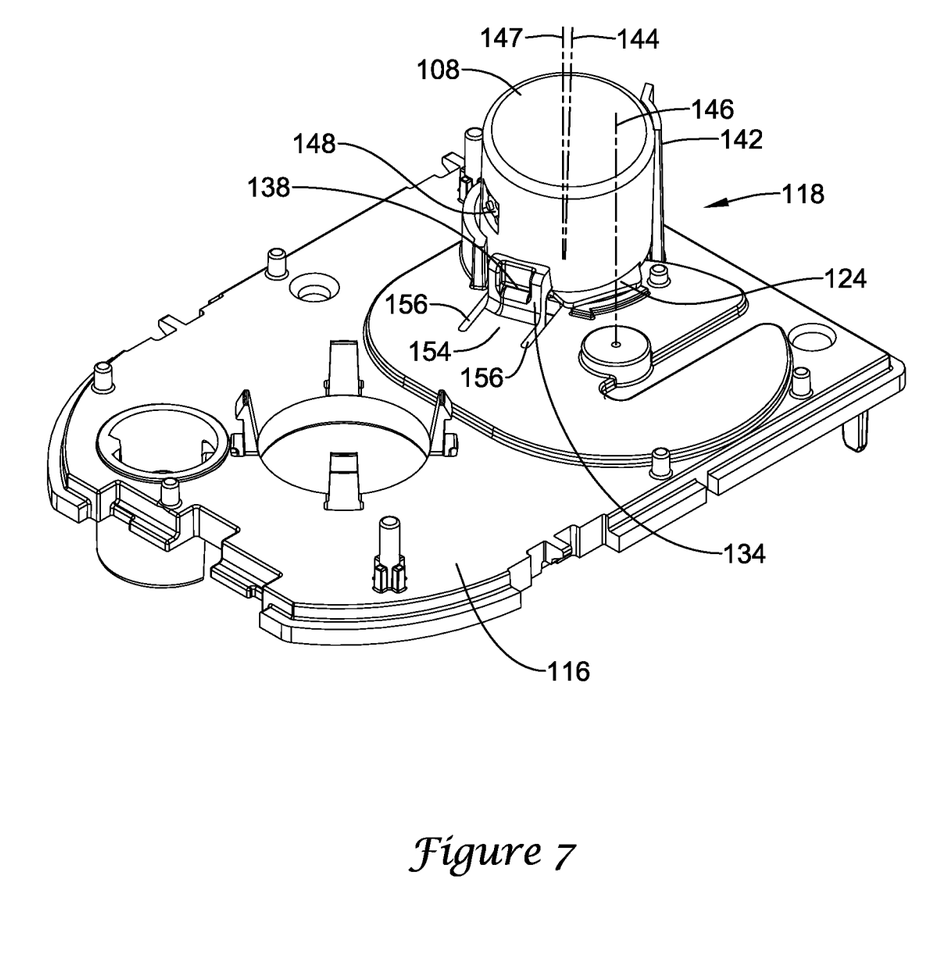
FIG. 7 is a schematic perspective view of the illustrative motor plate of FIG. 5, with a motor engaging a motor mount of the motor plate.

FIGS. 7-10 show schematic perspective views of motor 108 and motor mount 118 of motor plate 116 as the motor 108 is guided along a motion path and into alignment with the transmission during assembly, thereby bringing pinion 110 into engagement with first driven gear 112. In FIG. 7, which is rendered from a similar viewpoint to that of FIG. 5, the motor 108 has been brought manually from an entirely separated disposition relative to motor plate 116 to be in contact with some parts of the motor mount 118. The pinion 110 is placed into bore 132 of the motor plate 116, the second wing 126 is brought to bear on the top surface of second guide 136, and the first wing 124 is brought to bear against the motor plate 116 in the lateral space between first guide 134 and wall 142. In this position, the pinion 110 is not engaged with the first driven gear 112, without teeth of the two gears being fully intermeshed. Also, in this position the rotation axis 144 of the pinion 110 (i.e., the axis about which the pinion 110 rotates when driven by the motor 108) is not parallel with the rotation axis 146 of the first driven gear 112 (i.e., the axis about which the first driven gear 112 rotates in normal operation when mounted relative to the other components of the transmission such as the motor plate 116 and subsequent gears of the transmission). As a visual aid, FIGS. 7-10 also include a reference axis 147 that is parallel to rotation axis 146 of the first driven gear 112, but positioned along the desired rotation axis of the pinion 110 when the motor 108 is located at its final assembled disposition, secured to the motor mount 118 of motor plate 116. The angular relationship between axis 144 and axis 147, which is identical to the angular relationship between axis 144 and axis 146, may be more easily perceived visually.

Note the orientation of wire attachment point 148, where power and/or control wires (not shown) attach to motor 108. While first wing 124 and second wing 126 may be symmetrical in some examples, potentially allowing the motor to be positioned in the mount "backwards" with reversed wings, interference between the wires attaching to the motor and wall 142 of the motor mount 118 may prevent or at least discourage placement of the motor in the backwards orientation, providing the assembler of the motor with a cue to assist proper assembly. In some cases, the first wing 124 and second wing 126 may not be symmetrical and may interact with the motor mount 118 in a manner that help prevents the motor 108 from being positioned and mounted incorrectly.

Figure 8:
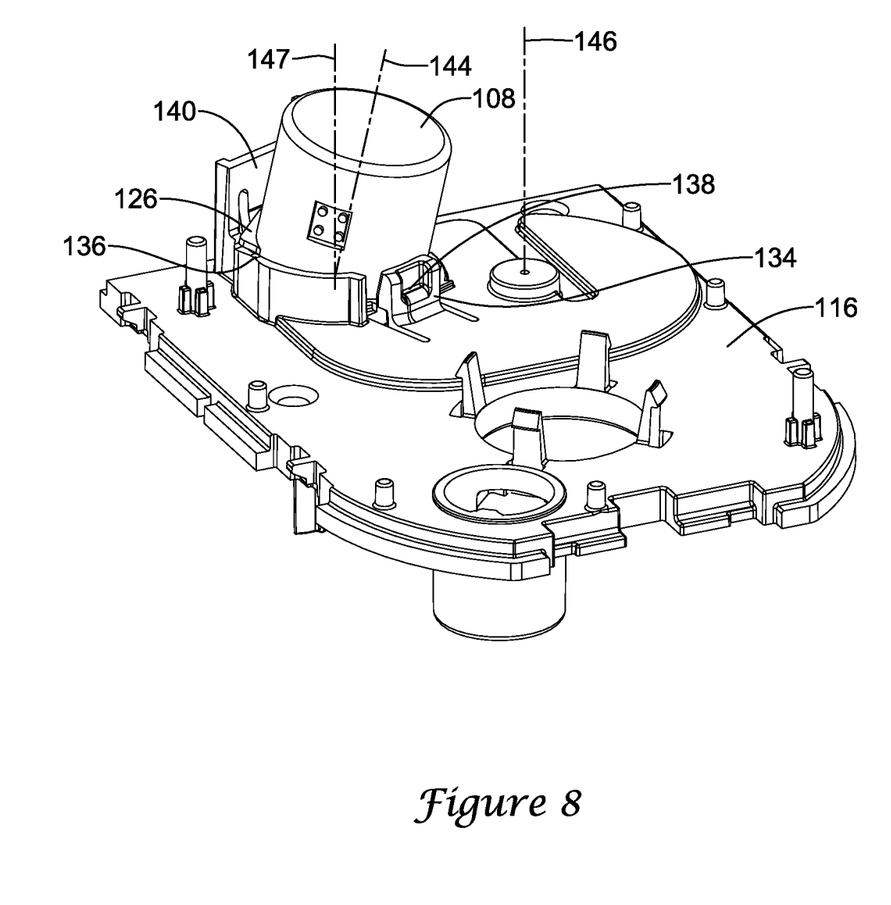
FIG. 8 is a schematic perspective view of the illustrative motor plate of FIG. 5 with a motor in a first position.
Figure 9:
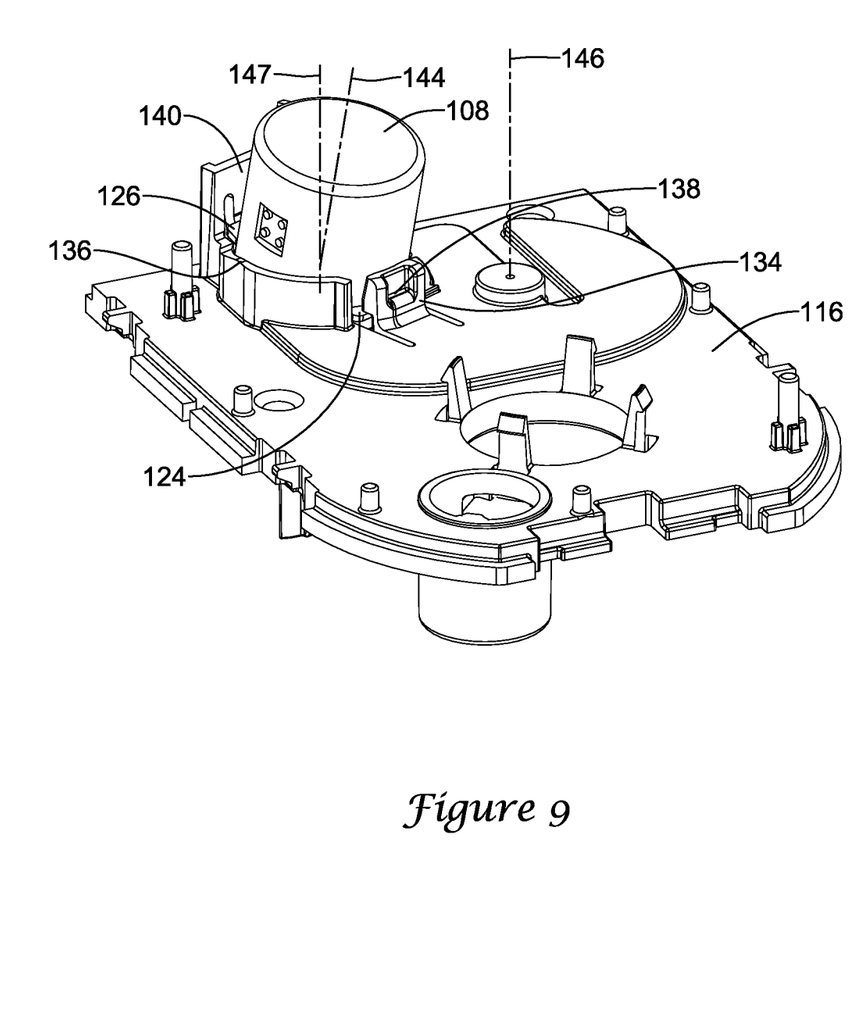
FIG. 9 is a schematic perspective view of the illustrative motor plate of FIG. 5 with the motor moved from the first position of FIG. 8 to a subsequent position.
Figure 10:
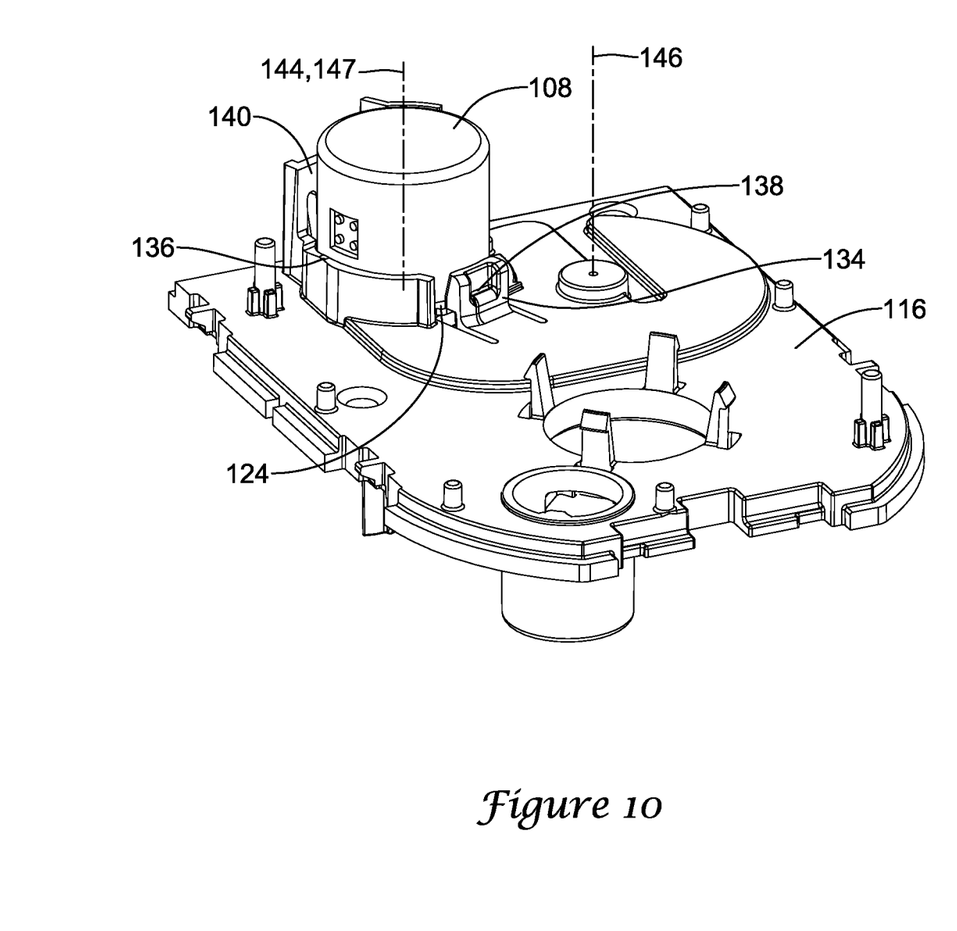
FIG. 10 is a schematic perspective view of the illustrative motor plate of FIG. 5 with the motor moved to a mounted or latched position.

FIGS. 8-10 are rendered from a viewpoint to the left of that of FIGS. 5 and 7. Compared to FIG. 7, in FIG. 8 the motor 108 has progressed just slightly along the motion path toward engagement with the transmission. In FIG. 8, the motor 108 is rotated slightly clockwise relative to the motor plate 116 such that the first wing 124 has just started to enter slot 138 of first guide 134, and the second wing 126 bears on the top surface of second guide 136. In the position of FIG. 8, the motor 108 may be constrained by the guide structures 134, 136 such that the gear teeth of the pinion 110 (drive gear) and the gear teeth of the first driven gear 112 of the transmission are not fully intermeshed, and the rotation axis 144 of the pinion 110 is not parallel with the rotation axis 146 of the first driven gear 112 of the transmission.

The axis of rotation about which motor 108 is rotated from the position of FIG. 7 to that of FIG. 8, and subsequently to the position of FIG. 9, may be considered to be substantially the same as, or similar to, the rotation axis of the pinion 110, but it may not be precisely the same. The axis of rotation about which motor 108 rotates as it progresses along the path from the position of FIG. 7 to those of FIGS. 8 and 9 may be determined by constraints resulting from the interaction between the wings 124, 126 of the motor and the guides 134, 136. As the motor 108 progresses along this motion path, the instantaneous axis of rotation may vary depending on these constraints, for example, due to the slope of second guide 136 toward the top surface of the motor plate 116. From the practical perspective of a manual or robotic assembler, the precise axis of rotation is not critical. The assembler may grasp the motor 108 and twist it clockwise (as viewed from above, as in FIGS. 7-10).

FIG. 9 shows an intermediate position between the position illustrated in FIG. 8 and the subsequent position illustrated in FIG. 10. The motion of motor 108 along the motion path from the positions of FIGS. 7 and 8 to the position of FIG. 10, where the motor 108 is in a final mounted position secured to motor plate 116, may be divided into at least two path segments, with FIG. 9 illustrating an intermediate position between a first path segment and a second path segment. During the first path segment, the flange 120 (and the motor 108 to which the flange 120 is attached) may be rotated substantially about the first rotation axis 144, with the first guide 134 guiding the first wing 124 of the motor flange and the second guide 136 guiding the second wing 126 of the motor flange toward the latch 140. As alluded to above, motion of the motor 108 along the first path segment may be induced manually by grasping the motor and twisting it clockwise.

At the end of the first path segment (i.e., in the position of FIG. 9), the second wing 126 of the motor flange 120 may still be spaced further from the motor plate 116 than the first wing 124, but it may be closer to the motor plate than in the positions of FIG. 7 or 8. This may correlate with the slope of the top surface of guide 136 toward the top surface of the motor plate 116. Similarly, in the position of FIG. 9, the position of the motor 108 may be such that the rotation axis 144 of the pinion 110 still is not parallel with the rotation axis 146 of the first driven gear 112 of the transmission, but the axes may be closer to being parallel than in the positions of FIGS. 7 and 8. In the position of FIG. 9, the gear teeth of the pinion 110 and the gear teeth of the first driven gear 112 may not be intermeshed or at least fully intermeshed. In the position of FIG. 9, the second wing 126 may not bear against the top surface of the second guide 136 any longer, and may have been rotated past the extent of the second guide 136, such that the second wing 126 may no longer be in contact with the second guide 136. In the intermediate position of FIG. 9, second wing 126 may be proximal to, but not captured by, latch 140.

The motor mount 118 may include one or more stops positioned to interfere with the first wing 124 and/or the second wing 126 to prevent over-rotation past the position illustrated in FIG. 9. Wall 142 (see FIG. 7) may provide a stop to interfere with second wing 126 and prevent its rotation past latch 140. First guide 134 may also include a stop (for example, at the end of slot 138) to interfere with first wing 124 to help prevent over rotation.

The position of FIG. 9 may represent an end point for the first path segment and a starting point for a second path segment. The second path segment may describe the motion of the motor 108 relative to the motor mount 118 between the positions of FIG. 9 and FIG. 10. Over the second path segment, the first wing 124 may remain relatively stationary (that is, it may not laterally slide in the first guide 134) and the second wing 126 may move downward toward the motor plate 116 until the second wing 126 is spaced substantially the same distance from the motor plate 116 as the first wing 124. A manual or automatic assembler may induce motion of the motor 108 along the second path segment by pressing the motor (for example, by pressing on the motor housing) down toward the motor plate 116. During this motion over the second path segment, the flange 120 (and consequently, the motor 108) may in effect pivot about the interface between first wing 124 and first guide 134. As second wing 126 may move downward toward the motor plate 116 over the second path segment until the second wing latch 140 is latched by the latch 140, thereby securing the motor 108 relative to the motor plate 116 and thus the transmission.

FIG. 10 shows motor 108 latched to motor plate 116, in the end position of the motion along the motion path starting from the initial positions of FIGS. 7 and 8. In this end position, the rotation axis 144 of the pinion 110 may be parallel or substantially parallel with the rotation axis 146 of the first driven gear 112 of the transmission, and one or more gear teeth of the first driven gear 112 may be intermeshed with one or more gear teeth of the pinion 110. During the motion of motor 108 relative to motor plate 116 along the motion path starting from the alignment illustrated in FIG. 7 and progressing through those illustrated in FIGS. 8, 9, and 10, the motor may be guided along the motion path by the first guide 134 and the second guide 136 such that the rotation axes 144, 146 of the pinion 110 and first driven gear 112, respectively, which initially may not be parallel, may be brought substantially parallel by the end of the motion. Note that the progression of the axes 144, 146 from non-parallel to parallel alignment may be achieved over the first path segment and the second path segment by differing degrees. For example, they may be brought into alignment to a small degree over the first path segment, with the majority of the alignment being achieved over the second path segment, or vice-versa. Similarly, with regard to the intermeshing of gear teeth of the pinion 110 and the first driven gear 112, this too may be achieved by differing degrees over the first path segment and the second path segment. The motions over both the first path segment and the second path segment may be considered rotations of the motor 108 relative to the motor mount 118 of the motor plate 116 (and hence the transmission), and the combined motion may be regarded as a compound rotation.

In the position of FIG. 10, where the flange 120 is received by the motor mount 118, the side wall 130 of pedestal 128 may bear against the side of the bore 132. This contact between the pedestal 128 and bore 132 may contribute to a positive, solid connection between the motor 108 and motor mount 118. Bore 132 may be surrounded, at least in part, by a collar 150 (see FIG. 5), against which flange 120 may bear when the flange 120 is received by the motor mount 118 in the position of FIG. 10. The motor mount 118 may include further motor supports, such as concentric ring 152 (see FIG. 5), against which flange 120 may also bear.

Additional features may contribute to a positive, solid connection between the motor 108 and motor mount 118. In some examples, first guide 134 may be resilient and provide a force that biases first wing 124 toward the motor plate as the motor 108 proceeds along a motion path into alignment with the transmission during assembly. In some examples, a resilient first guide 134 may be disposed on a beam 154 flanked by slots 156 integral to motor plate 116. Any other suitable resilient construction of first guide 134 may also be used.

Figure 11:
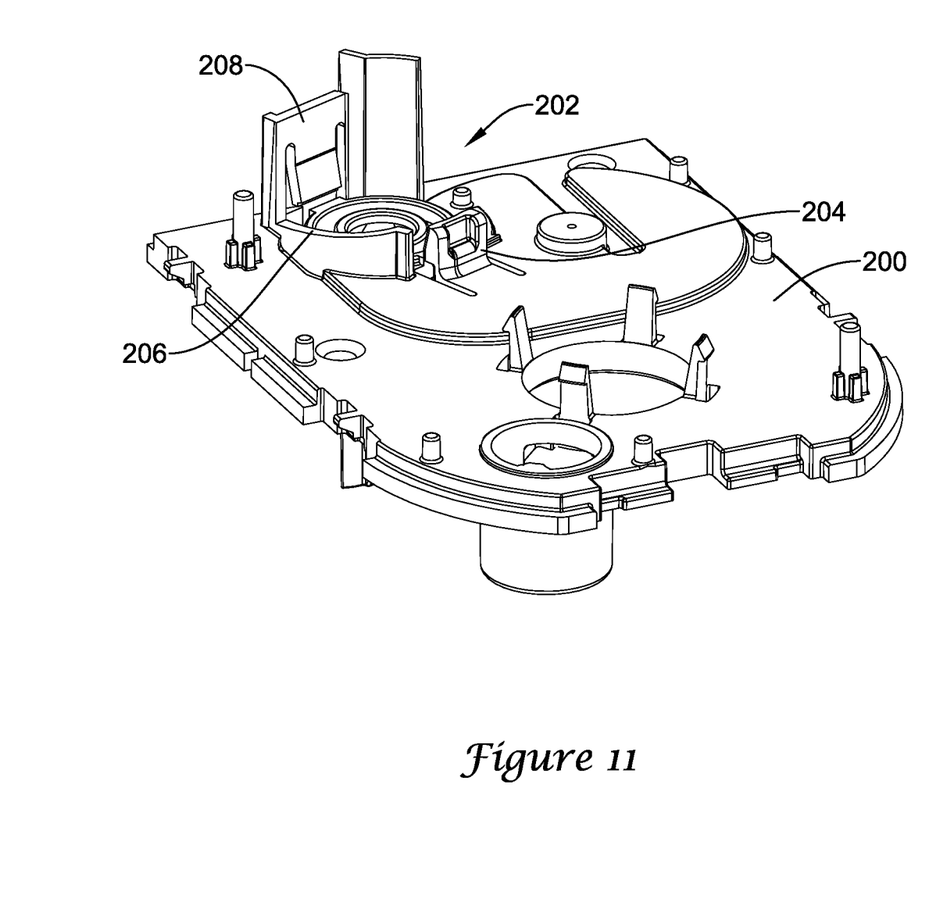
FIG. 11 is a schematic perspective view of another example motor mount.

FIG. 11 is a schematic perspective view of a motor plate 200 with a motor mount 202 that is an alternative to motor mount 118 of the example of FIGS. 1-10. Motor mount 202 includes a first guide 204 and a second guide 206. The top surface of second guide 206 slopes down toward the top surface of motor plate 200 to a greater degree than does the top surface of first guide 204 of motor mount 118. With such a slope, second guide 206 may guide a wing such as second wing 126 of motor 108 directly to a position where it may be captured by a latch 208 or the like. With such a configuration, a motor may be mounted securely to motor plate 200 in essentially a single rotation along single path segment, without an intermediate position between multiple path segments as in the example illustrated and described with respect to FIGS. 7-10.

While the example HVAC actuator of FIGS. 1-10 includes first and second wings 124, 126 of flange 120 that are guided by first and second guides 134, 136, other configuration are contemplated. For example, a motor may include projecting structures other than wings of a flange that may be guidable by guides of a motor mount. Such structures may be located other than at the end of a motor closest to a motor plate. In another alternative configuration, rather than having wings or other projections, a motor housing could include one or more recessed tracks, and the motor mount could features projections into the recessed tracks of the motor housing. Other alternative configurations within the spirit and scope of the present disclosure may be apparent to persons having ordinary skill in the art.

Figure 12:
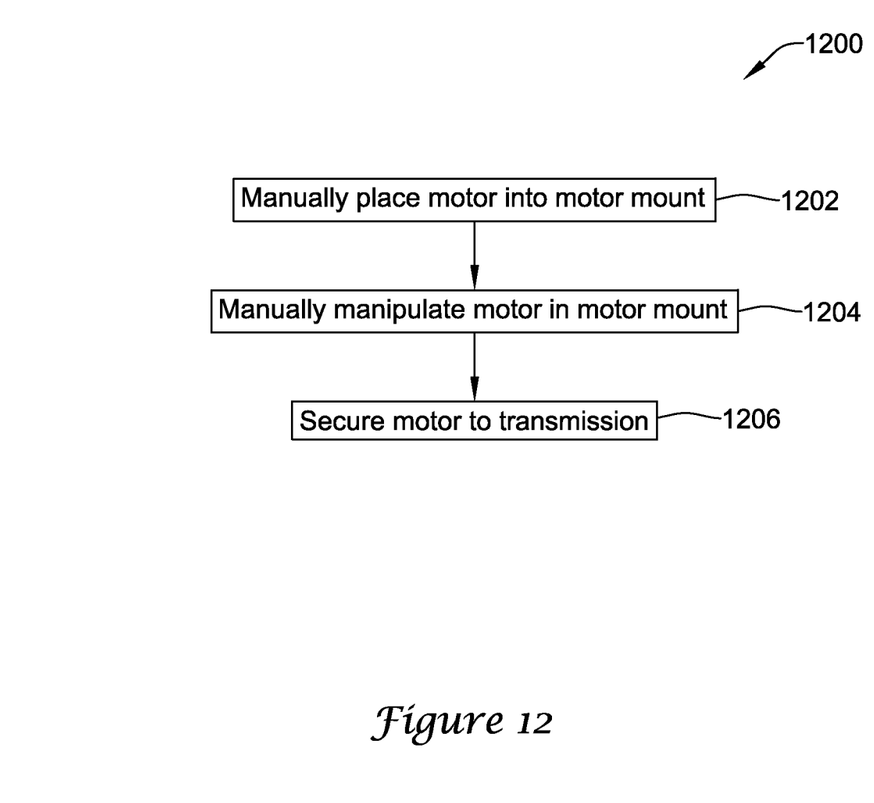
FIG. 12 is a flow chart showing an illustrative method of engaging a drive gear of a motor with a driven gear of a device such as an HVAC device.

FIG. 12 is a flowchart of an illustrative method 1200 for engaging a drive gear of a motor with a driven gear of an HVAC device. The HVAC device may be similar to those described herein, with the motor and/or the HVAC device having guide structures that guide the motor relative to the HVAC device as the motor is manipulated along a motion path during an assembly procedure of the HVAC device. At 1202, the method includes the step of manually placing the motor into engagement with a motor mount of the HVAC device in a first position. In the first position, the position of the motor may be constrained by the guide structures such that the gear teeth of the drive gear and the gear teeth of the driven gear are not fully intermeshed, and a rotation axis of the drive gear is not parallel to a rotation axis of the driven gear. At 1204, the illustrative method includes the step of manually manipulating the motor in the motor mount of the HVAC device. The manipulation may be performed with the motor constrained by the guide structures along the motion path until the gear teeth of the drive gear and the gear teeth of the driven gear are intermeshed or more fully intermeshed, and the rotation axis of the drive gear is parallel or substantially parallel to the rotation axis of the driven gear. Step 1204 may include simultaneously rotating the motor about the rotation axis of the drive gear and moving the motor such that the rotation axis of the drive gear moves more parallel to the rotation axis of the drive gear. It may then subsequently include moving the motor such that the rotation axis of the drive gear moves more parallel to the rotation axis of the drive gear without simultaneously rotating the motor about the rotation axis of the drive gear. This is just one example. Method 1200 may further include a step 1206 of securing the motor relative to the transmission once the gear teeth of the drive gear and the gear teeth of the driven gear are intermeshed, and the rotation axis of the drive gear is substantially parallel to the rotation axis of the driven gear.

The disclosure should not be considered limited to the particular examples described above, but rather should be understood to cover all aspects of the disclosure and equivalents thereof. Various modifications, equivalent processes, as well as numerous structures to which the disclosure can be applicable will be readily apparent to those of skill in the art upon review of the instant specification.

What is claimed is:

1. A system for guiding a motor into alignment with a transmission during assembly of the motor with the transmission, comprising:
   a flange configured to be attached to a motor proximal a pinion of the motor, the flange having a first wing and a second wing opposite the first wing, the first wing and the second wing flanking the pinion;
   a motor mount for the transmission, the motor mount including:
   a bore structured to accommodate the pinion of the motor;
   one or more guide structures adjacent the bore, including:
      a first guide for guiding the first wing;
      a second guide for guiding the second wing;
      wherein the first guide and the second guide are configured to mechanically guide the first wing and the second wing, respectively, such that the motor moves in a motion along a path, wherein in a first position along the path, a rotation axis of the pinion is not parallel with a rotation axis of a driven gear of the transmission, and as the motor is guided further along the path by the first guide and the second guide, the rotation axis of the pinion is brought substantially parallel to the rotation axis of the driven gear of the transmission and one or more gear teeth of the driven gear are brought to intermesh with one or more gear teeth of the pinion.

2. The system of claim 1, wherein the motion along the path includes a number of positions that are progressed through sequentially, the number of positions including:
   the first position in which the first wing is disposed in the first guide, and the second wing bears against a top surface of the second guide, wherein in the first position, the rotation axis of the pinion is not parallel with the rotation axis of the driven gear of the transmission and none of the gear teeth of the driven gear intermesh with the gear teeth of the pinion;
   a second position achieved from the first position via rotation of the motor relative to the motor mount of the transmission, wherein in the second position, the rotation axis of the pinion is substantially parallel with the rotation axis of the driven gear of the transmission and at least one of the gear teeth of the driven gear intermesh with at least one of the gear teeth of the pinion.

3. The system of claim 2:
   wherein the number of positions further includes an intermediate position between the first position and the second position, wherein in the intermediate position, the second wing does not bear against a top surface of the second guide and the second wing is proximal to but not captured by a latch; and
   wherein in the second position, the second wing is captured by a latch.

4. The system of claim 3, wherein the path between the intermediate position and the second position includes moving the second wing down toward the transmission to engage the latch while not substantially moving the first wing relative to the first guide.

5. The system of claim 3, wherein the latch is structured to form an interference fit with the second wing when the second wing is captured by the latch.

6. The system of claim 2, wherein the motor mount further includes a stop positioned to interfere with the first wing and/or the second wing to prevent over-rotation.

7. The system of claim 1, wherein the flange further comprises a pedestal spacing the pinion away from the flange, the pedestal having a side wall that bears against a side of the bore when the flange is received by the motor mount in the second position.

8. The system of claim 7, wherein the motor mount includes a collar surrounding at least part of the bore, the flange bearing against the collar when the flange is received by the motor mount in the second position.

9. A guide system for guiding a motion of a motor to bring a drive gear of the motor into engagement with a driven gear of an HVAC device, the drive gear and the driven gear each having gear teeth, the drive gear driven by the motor about a first rotation axis and the driven gear mounted to be rotatable about a second rotation axis, the guide system comprising:
- a guide for mechanically guiding the motor in a motion along a path, wherein in a first position along the path, the first rotation axis of the drive gear is not parallel with the second rotation axis of the driven gear and the gear teeth of the drive gear are not intermeshed with the gear teeth of the driven gear, and as the motor progresses to a second position along the path, the first rotation axis of the drive gear is brought substantially parallel with the second rotation axis of the driven gear and the gear teeth of the drive gear become intermeshed with the gear teeth of the driven gear.

10. The guide system of claim 9, wherein the guide includes one or more guide structures fixed relative to the driven gear, wherein the one or more guide structures cooperate with a housing of the motor to mechanically guide the motion of the motor along the path.

11. The system of claim 10 wherein the housing of the motor includes a flange proximal the drive gear, wherein the flange has a first wing and a second wing flanking the drive gear, the first wing and the second wing configured to cooperate with the one or more guide structures of the guide to help mechanically guide the motion of the motor along the path.

12. The system of claim 11, wherein the one or more guide structures include:
- a motor plate, the driven gear being affixed adjacent a bottom side of the motor plate and the motor being mountable on a top side of the motor plate;
- a bore through the motor plate dimensioned to accommodate the drive gear of the motor;
- a first guide adjacent the bore on the top side of the motor plate, the first guide configured to guide the first wing;
- a latch adjacent the bore on the top side of the motor plate, the latch configured to capture the second wing; and
- a second guide generally concentric with respect to the bore, spaced above the top side of the motor plate, the second guide configured to guide the second wing to the latch.

13. The system of claim 12, wherein the first guide is generally concentric with respect to the bore and includes at least one surface against which the first wing bears, the at least one surface extending a substantially constant distance above the top side of the motor plate along at least part of its length.

14. The system of claim 13, wherein the second guide slopes down toward the top side of the motor plate along at least part of its length.

15. The system of claim 12, wherein the motion along the path is divided into at least two path segments, including:
- a first path segment where the flange is rotated substantially about the first rotation axis and the first guide guides the first wing of the motor flange and the second guide guides the second wing of the motor flange toward the latch, and wherein at the an end of the first path segment, the second wing of the motor flange is spaced further from the motor plate than the first wing; and
- a second path segment extending from the end of the first path segment where the first wing remains relatively stationary and the second wing is moved down toward the motor plate until the second wing is spaced substantially the same distance from the motor plate as the first wing and the latch forms an interference fit with the second wing thereby securing the motor relative to the motor plate.

16. The system of claim 9, wherein the guide is configured to mechanically guide the motor along the path during a manual assembly process of the HVAC device.

\* \* \* \* \*